United States Patent Office 2,876,036
Patented Mar. 3, 1959

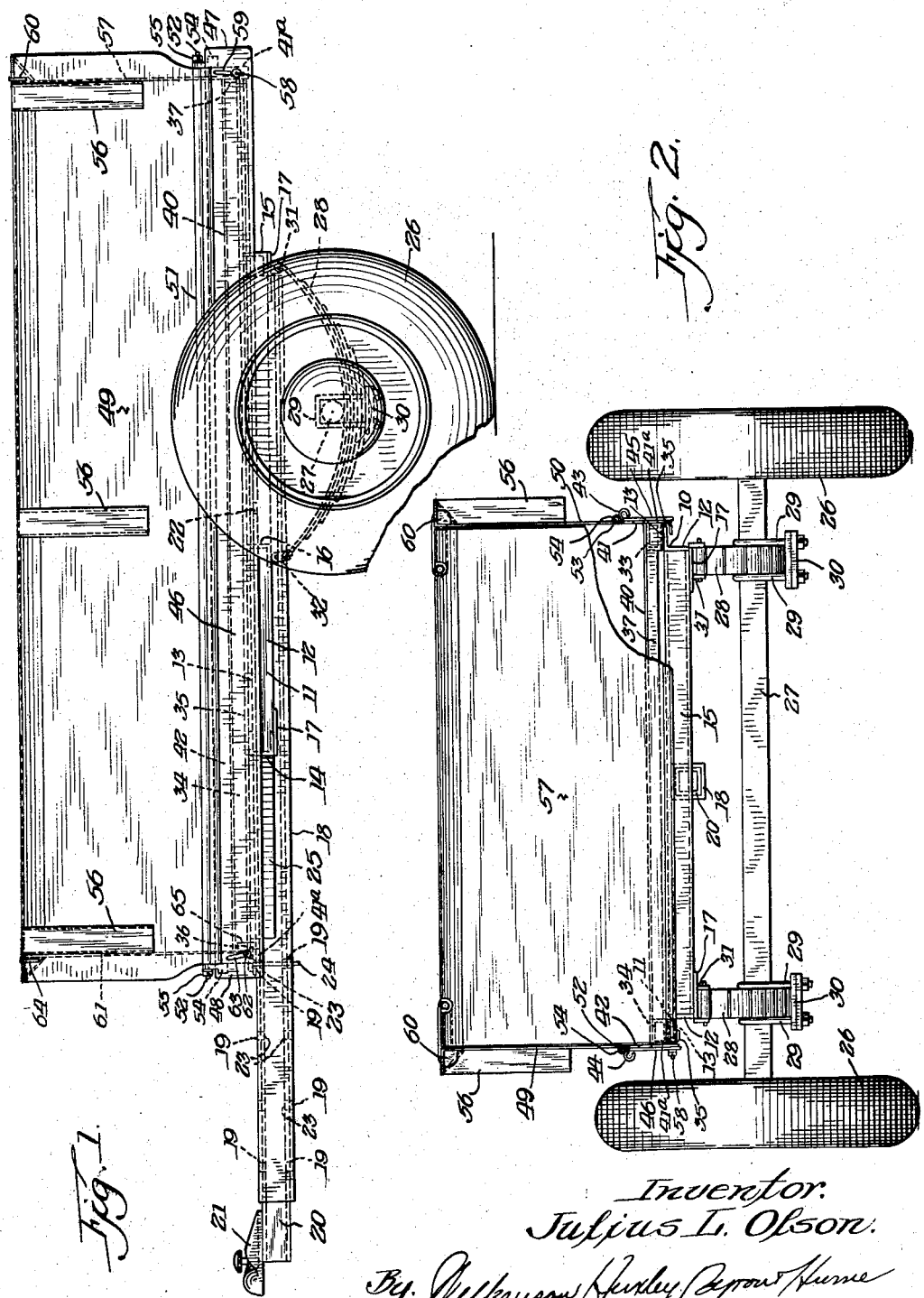

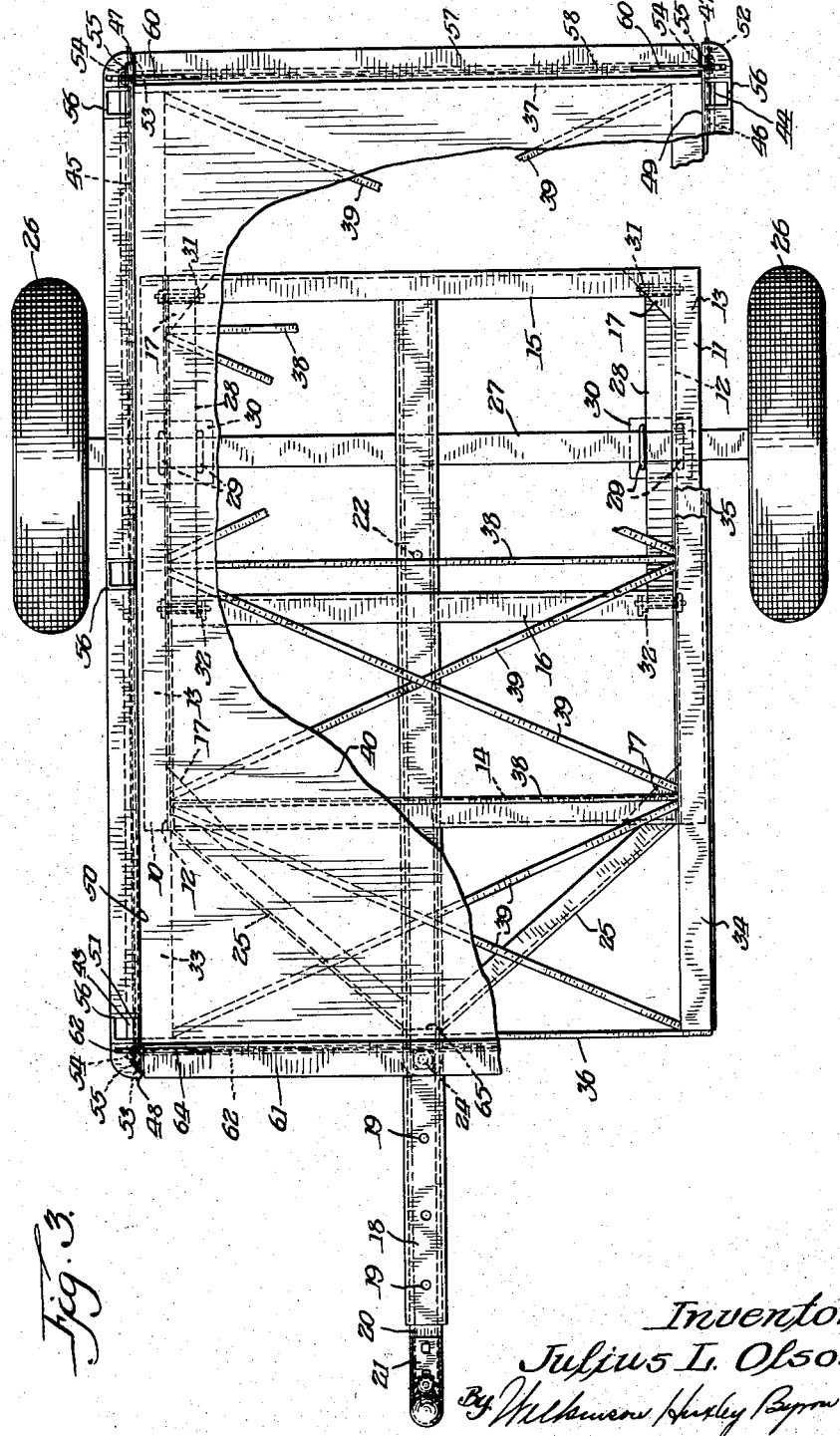

2,876,036

COLLAPSIBLE TRAILER

Julius L. Olson, Evanston, Ill.

Application November 5, 1954, Serial No. 467,109

2 Claims. (Cl. 296—27)

My invention relates to a collapsible slidable trailer body and chassis and has particular reference to a trailer adapted to be drawn by an automobile, and when it is not desired for use, the sides and ends of the trailer body can be folded into a compact position and the trailer stood on its rear end, thereby enabling the trailer to be stored in restricted space of no greater width than is the height of the wheels, and so far as height is concerned, within a garage of the usual height, so that the trailer when not in use can be prepared for storage very easily with minimum effort and without occupying a great deal of space in a garage.

Another object of my invention is the provision of a trailer which is especially adaptable for camping and fishing trips because of the versatile type of construction for camping purposes and in which camping supplies can be loaded in the body of the trailer and if desired can be changed to transport a boat in which various camping supplies can be loaded and transported if desired.

Another and further object of my invention is the provision of a trailer in which the body may be placed in various positions with respect to the chassis, so that the lading can be distributed in the body of the truck in the most advantageous and desirable position and without too much of the weight of the lading being borne by the draft bar, which is common with many types of trailers.

Another and further object of the invention is the provision of a trailer which can be easily and quickly stored in a comparatively small space and in which the trailer can be quickly and safely prepared for storage and in which the body is slidably mounted with respect to the chassis, and when in storage position the major portion of the weight of the body is sustained by the body frame having the rear end resting upon the ground or floor, as the case may be, and with very little weight being carried by the wheels and thus removing the load from the tires on the wheels to a very great extent, resulting in longer life of the tires and less liability of a breaking-down or lessening of the physical structure of the usual type rubber tires when placed in a load-carrying position for fairly long periods of time and in a shelter to protect the trailer from weather conditions, and the like.

Another and further object of my invention is the provision of a collapsible trailer body which can be easily and quickly removed from the chassis of the truck, if desired, and some other form of carrying structure substituted therefor, or the body may be omitted entirely and the load carried upon the chassis frame of the truck, if desired.

Another and further object of my invention is the provision of a collapsible trailer in which one or both of the end gates of the body can be folded down into a flat position on the bottom of the body and a boat cradle placed in position upon the folded sides, with the draft bar being telescopically extended so that supplies, particularly for a fishing trip, can be loaded into the boat and the boat and supplies transported in the trailer, as may be found necessary or desirable.

These and other objects of my invention will be more fully and better understanding by reference to the accompanying drawings and in which Fig. 1 is a side elevational view of my improved trailer.

Fig. 2 is a rear end elevational view of the trailer shown in Fig. 1 with certain of the parts cut away to show details, particularly of the corner construction of the body, and Fig. 3 is a plan view of the trailer shown in Fig. 1 showing three levels of the trailer truck shown in Fig. 1.

Referring now specifically to the drawings and in which like reference characters refer to like parts throughout, and in which a chassis and a removable body for a trailer are shown, the chassis comprising a rectangular support frame consisting of side angles 10 and 11, each of these angles comprising a vertical flange 12 and a horizontal flange 13, a front cross channel member 14 and a rear cross channel member 15, and an intermediate cross channel member 16. The ends of each of the cross channel members 14, 15 and 16 are fitted against the inner side of the vertical flanges 12, 12 of the side angles 10 and 11 and welded thereto, thus forming a unitary rectangular-shaped frame. Corner gussets 17, 17, triangular in shape, are provided which are welded to the side angles 10 and 11 and to the front cross member 12 and the rear cross member 15 to strengthen the rectangular frame at the corners.

A hollow rectangular-shaped draft member 18 is provided which extends longitudinally of the chassis support frame intermediate the side angles 10 and 11 and through openings formed in the cross members 14 and 16 which are preferably channel sections, the openings for the draft member 18 being formed by the removal of portions of the web and one flange of each of the cross members 14 and 16, thereby providing an opening to receive the draft member 18 which is fitted against and welded to the top flange of each of the cross members 14 and 16, abuts against and is welded to the cross member 15 at its rear end and extends forwardly of the support frame a short distance and has a plurality of holes 19, 19 therein, for purposes hereinafter described. A draft bar 20, rectangular in shape, is telescopically mounted in the draft member 18 which normally extends the full length of the draft member 18 and projects outwardly from the forward end thereof and has a coupling member 21 mounted thereon which co-operates with a coupling on an automobile, truck, or the like for pulling the trailer. The draft bar 20 may be pulled out to provide an elongated draft appliance for the purpose of adapting the trailer to the transporting of boats, or the like, as will be described hereinafter, and has holes 22 and 23 formed therein which may be placed in register with one of the holes 19, 19 in the draft member 18 and a pin 24 inserted therethrough to hold the draft bar 20 and draft member 18 in operative relation with each other and to hold the body of the trailer in a selected position, as hereinafter described. A pair of braces 25, 25 is provided, which braces are secured to the draft member 18 at each of its sides at one of their ends and to the cross member 14 adjacent its outer ends, for the purpose of further strengthening the chassis frame, particularly against sidewise movements of the draft member 18 and draft bar 20, and also to provide a support for the forward end of the body of the trailer.

Wheels 26, 26 are provided which are mounted upon the ends of an axle 27, with semi-elliptical springs 28, 28 being provided which are secured to the axle 27 by means of U-bolts 29, 29 and plates 30, 30. Shackles 31, 31 are provided at the rear ends of each of the springs 28, 28 which are welded to the lower flange of the cross member 15 and other shackles 32, 32 are provided which are welded to the under side of the lower flange of the intermediate cross member 16, the shackles 31 and 32 supplying mountings for each of the springs 28, 28 so as to form a complete chassis for the support of the body of the trailer.

The body of the trailer comprises a bottom frame, a bottom on the said frame having upturned side edges, side panels mounted upon the upturned edges of the bottom and end gates pivotally mounted upon the base frame and capable of rotation in an arc of at least 180 degrees so as to be out of the way for loading and unloading of lading from the body of the trailer and to lie down flat on the bottom of the trailer body when a boat or unusually long object is being transported, all of which are co-operatively secured together to form a box-like structure open at its top and closed as to all other directions. The base frame for the body comprises a pair of side sills 33 and 34 which extend along each side of the body and have a pair of J-shaped members 35, 35 welded to the lower sides thereof, the free ends of which members are fitted over the edge of the horizontal flanges 13, 13 on the side angles 10 and 11 of the chassis, which anchors the body of the trailer to the chassis and which enables the body of the trailer to be moved longitudinally on these slides to various positions for load balancing and storage purposes.

A front bottom frame bar 36 and a rear bottom bar 37 are provided which overlie the ends of the side sills 33 and 34 at each of their ends and are welded thereto with a plurality of intermediate cross bars 38, 38, and also a plurality of diagonally extending bars 39, 39 are provided, each of said bars being placed in abutting end-to-end relation with the side sills 33 and 34 and welded at their ends to the said side sills 33 and 34, thereby providing a solid bottom frame for the support of the trailer body. A bottom 40 is provided having upturned side portions 41 and 42 along each of its sides, which said side portions terminate in flanged edge portions 43 and 44—the bottom 40 being supported along its sides by the sills 33 and 34, at its ends by the end bars 36 and 37 and its intermediate portions by the cross bars 38, 38 and the diagonal bars 39, 39. A pair of reinforcing plates 45 and 46 extend along the outer faces of the upturned portions 41 and 42 of the bottom 40 and extend downward so their lower edges are in register with the lower faces of the J-shaped members secured to the sills 33 and 34. The upturned side portions 41 and 42 of the bottom 40 have ears 41a which extend downward at each of the corners between the side sills 33 and 34 and the J-shaped members 35, 35 and the plates 45 and 46, with the plates 45 and 46 being spot-welded to the upturned side portions 41 and 42 and to the sills 33 and 34 and to the J-shaped members, with the assembly, including the ears 41a, welded together at the lower corners of the trailer body, all of which serves to reinforce the bottom of the trailer body. The plates 45 and 46 have extended portions 47, 47 at each of their rear ends upon which the trailer body rests when in vertical position for storage and has projecting ends 48, 48 at their front ends to prevent damage to the trailer body at the front end.

Side members 49 and 50 are provided for each side of the body having rolled lower edges 51, 51 thereon extending the entire length of the side members 49 and 50, which rest upon the flanged edges 43, 43 of the upturned portions 41 and 42 of the bottom 40 and have pintles 52 and 53 extending therethrough, and through brackets 54, 54 spot-welded to the inner faces of the extended portions 47 and 48 of the reinforcing plates 45 and 46, with nuts 55, 55 threaded onto each of the ends of the pintles 52 and 53 whereby the side members 49 and 50 are hinged to the upturned portions 41 and 42 of the bottom 40 and may be folded inwardly to lie flat inside the body of the trailer. Stake holders 56, 56 are secured to each of the side members 49 and 50 into which stakes can be inserted for the support of a cover for the trailer body or for holding articles extending above the top edges of the side members 49 and 50, if desired. These stake holders also provide means whereby a boat cradle may be mounted upon the sides 49 and 50 when the sides are lying flat in the body of the trailer.

A rear end gate 57 is provided which has a rod 58 mounted in a rolled flange along its lower side and the ends of the rod 58 projecting outwardly through inclined slots 59, 59 in the reinforcing plates 45 and 46 and through the ears 41a, with threaded nuts on each end of the rod 58 to prevent the rod 58 from moving laterally out of position, the rod 58 operating as a pintle upon which the end gate 57 rotates in an arc of at least 270 degrees and can be suspended from the rod 58 in the full open position or rotated in the opposite direction to lie upon the floor 40 of the truck body. Latches 60, 60 are provided at each of the upper corners of the end gate 57, which are pivotally mounted at their inner ends and extend through cutouts in the side walls 49 and 50, with latching hooks which engage over the side walls 49 and 50 adjacent the notches cut therein to hold the end gate in closed position upon the body of the trailer. The end gate as shown in Fig. 1 is in closed position and when it is desired to open the end gate the latches 60, 60 are unhooked from the sides of the trailer, the end gate may thereupon be tilted in a clockwise direction (Fig. 1) and turned in an arc of 180 degrees so that it hangs downward and is suspended from the pintle 58. The lower edge of the end gate 57 is below the floor 40 of the truck body and because the slots 59, 59 incline forwardly toward their bottom ends and the pintle 58 is normally in the bottom of the slots 59, 59 as the end gate 57 is placed into closed position, it is brought into close engagement with the cross member 36 supporting the body of the trailer and forming a tight fit with the bottom 40. In order that the end gate rotate in a counter-clockwise direction (Fig. 1), its lower edge must be raised above the level of the floor 40, in which position it can be rotated inwardly to lie flat upon the floor 40 of the trailer.

A front end gate 61 is provided which is a duplicate of the end gate 57 hereinabove described and is mounted upon a rod 62 which extends through a roll flange at the bottom thereof and has projecting ends which extend into inclined slots 63, 63 in the reinforcing plates 45 and 46 and through the ears 41a, with latches 64, 64 being provided which are fitted into notches cut in the side members 49 and 50, so that the forward end gate is held in closed position but may be rotated inwardly by being lifted in the slots 63, 63 so that its lower edge is above the floor 40 of the truck body when it may be folded inwardly to lie upon the floor 40 of the truck, or may be opened outwardly, if desired, by being rotated in a counter-clockwise direction for the hauling of objects too long to be received into the truck body.

A short angle 65 is provided having its vertical face welded to the forward transverse body frame members 36, and has a horizontal portion projecting forwardly therefrom to be fitted over the upper side of the draft member 18 with an opening therein through which the pin 24 passes, this pin passing through the opening in the angle 65 which holds the trailer body in fixed position upon the chassis and which may be moved to different positions upon the chassis base and the pin 24 inserted into the registered openings in the draft member 18 and the draft bar 20 for the purpose of positioning the lading in the truck body relative to the axle, if desired.

It is believed that the construction and operation of the trailer will be readily understood from the foregoing description. When it is desired to store the trailer, the end gates 57 and 61 are folded inwardly, as heretofore described, so that they lie flat upon the floor 40 of the body of the trailer, and the side members 49 and 50 folded inwardly upon the end gates 57 and 61 to form a completely collapsed body for storage purposes.

After the truck body has been collapsed, the trailer is moved to the desired position, the pin 24 is removed and the body and chassis rotated upon the axle 27 in a clockwise direction (Fig. 1) until the rear end of the trailer is resting upon the ground, in which position a continuous movement of the trailer and chassis to an erect position will cause the chassis to slide rearward as the wheels 26, 26 rest upon the floor or the ground and the trailer is thereby supported in a vertical position, resting upon the rear end of the body portion of the trailer and upon the wheels and confined in a space which is equal to the height of the wheels, so that the trailer can be stored in a very small space, if desired. Both the collapsing of the body and the storing of it can be accomplished very easily and quickly without danger of injury to the operator and without very great manual effort. In setting the trailer up for operation, the reverse operation takes place in that the trailer is tilted forwardly until the load is completely sustained upon the wheels, when the truck body can be moved to any desired position and the pin 24 inserted so that the body of the trailer is held in the proper relative position with respect to the trailer chassis. In this manner the truck can be easily restored for use when desired.

For transporting a boat, the end gates and side panels are folded down inside the body of the trailer and a boat cradle placed upon the sides and secured thereto in any approved manner by the stake holders 56, 56, a boat loaded thereon and the draft bar 20 adjusted in the draft member 18 to provide sufficient space between the automobile to which the trailer is hitched and to the end of an ordinary boat, so that it can be easily transported, if desired.

While I have described more or less precisely the details of construction, I do not wish to be understood as limiting myself thereto, as I contemplate changes in form, the proportion of parts and the substitution of equivalents as circumstances may suggest or render expedient without departing from the spirit or scope of my invention.

What is claimed is:

1. An automobile trailer comprising a chassis having a support frame thereon including guides at each of the sides of the support frame, a draft member on the support frame having a plurality of spaced openings therein, a trailer body of greater length than is the support frame on the chassis comprising a bottom frame having side sills along each of its sides, J-shaped guide members on the sides of the said side sills in engagement with the guides on the support frame the free ends of which underlie the guides of the support frame of the chassis, cross members secured at their ends to the side sills of the body frame, a bottom on the said bottom frame having upturned edge portions, reinforcing plates secured to the upturned portions of the bottom and extending beyond the ends of the upturned portions of the bottom at each of their ends, side members for the body hinged to the edges of the upturned portions of the bottom, end gates hinged to the extended ends of the reinforcing plates, a holding member on the said body and a removable pin extending through the said holding member and into the openings in the draft member whereby the body is held in selected positions on the support frame, whereby the body may be slid forwardly on the support frame so that the rear ends of the body and frame are substantially even whereby the overall length of the body and frame including the draft member are reduced to a minimum for storage of the trailer on end.

2. An automobile trailer comprising a chassis having a rectangular support frame thereon, the said support frame having angles at each of its sides, draft members telescopically connected to the said chassis having a plurality of spaced openings therein, a trailer body mounted on the said support frame having a length greater than the support frame, hinged side and end members on the said trailer body, members fixed to the body and slidably extending under the edges of the angles on each side of the said support frame whereby the body may be slid forwardly in the said support frame so that the rear ends of the body and support frame are substantially even and the overall length of the body and chassis including the draft member are reduced to a minimum for storage of the trailer on end and a pin removably positioned in the said body and the draft members.

References Cited in the file of this patent

UNITED STATES PATENTS

| | | |
|---|---|---|
| 2,174,063 | Richards | Sept. 26, 1939 |
| 2,374,383 | Sampsell | Apr. 24, 1945 |
| 2,456,013 | Nelson | Dec. 14, 1948 |
| 2,469,506 | Kerr et al. | May 10, 1949 |
| 2,485,793 | Vassar | Oct. 25, 1949 |
| 2,713,951 | Davies | July 26, 1955 |
| 2,717,707 | Martin | Sept. 13, 1955 |
| 2,720,413 | Halverson | Oct. 11, 1955 |